(12) United States Patent
Scarlin

(10) Patent No.: US 7,168,916 B2
(45) Date of Patent: Jan. 30, 2007

(54) WELDED ROTOR FOR A THERMAL MACHINE, AND PROCESS FOR PRODUCING A ROTOR OF THIS TYPE

(75) Inventor: Richard Brendon Scarlin, Oberflachs (CH)

(73) Assignee: Alstom Technology Ltd., Baden (CH)

( * ) Notice: Subject to any disclaimer, the term of this patent is extended or adjusted under 35 U.S.C. 154(b) by 197 days.

(21) Appl. No.: 10/958,424

(22) Filed: Oct. 6, 2004

(65) Prior Publication Data
US 2005/0106012 A1   May 19, 2005

(30) Foreign Application Priority Data
Oct. 14, 2003   (DE) ................ 103 48 424

(51) Int. Cl.
F01D 5/06   (2006.01)
(52) U.S. Cl. .................. 415/199.5; 415/216.1
(58) Field of Classification Search .......... 415/216.1, 415/199.5; 416/213 R, 244 A
See application file for complete search history.

(56) References Cited

U.S. PATENT DOCUMENTS

| 6,152,697 A | 11/2000 | Konishi et al. |
| 2002/0136659 A1* | 9/2002 | Staubli et al. ........... 419/9 |

FOREIGN PATENT DOCUMENTS

| DE | 39 03 588 C2 | 9/1993 |
| DE | 199 53 079 A1 | 5/2001 |
| DE | 101 12 062 A1 | 9/2002 |
| JP | 61042492 A * | 2/1986 |

OTHER PUBLICATIONS

Search Report from DE 103 48 424.8 (Jun. 4, 2004).
Bachelet, E. et al., eds., "High temperature materials for power engineering 1990." Kluwer Academic Publisher. Liege, Sep. 24-27, 1990, pp. 1309-1318, 1461-1490.

* cited by examiner

Primary Examiner—Richard A. Edgar
(74) Attorney, Agent, or Firm—Cermak & Kenealy, LLP; Adam J. Cermak

(57) ABSTRACT

A rotor (10) for a thermal machine, in particular a steam or gas turbine, includes a plurality of rotor disks (12, 13, 14) which are arranged one behind the other in the rotor axis (11) and are welded to one another, at least one first rotor disk (13), which is arranged in a section of the rotor (10) which is subject to particularly high thermal loads, including a nickel-base alloy which is able to withstand high temperatures and is welded to at least one second, adjacent rotor disk (12, 14), which includes a steel which is able to withstand high temperatures. In a rotor (10) of this type, accurate testing of the welded joints located in the high-temperature region is achieved by nondestructive testing by virtue of the fact that a first rotor ring (15, 16) of a steel which is able to withstand high temperatures is inserted between the first and second rotor disks (13 and 12, 14), which first rotor ring (15, 16) on one side is welded to the second rotor disk (12, 14) and on the other side is joined to the first rotor disk (13) via an encircling weld seam (21, 21', 26).

15 Claims, 3 Drawing Sheets

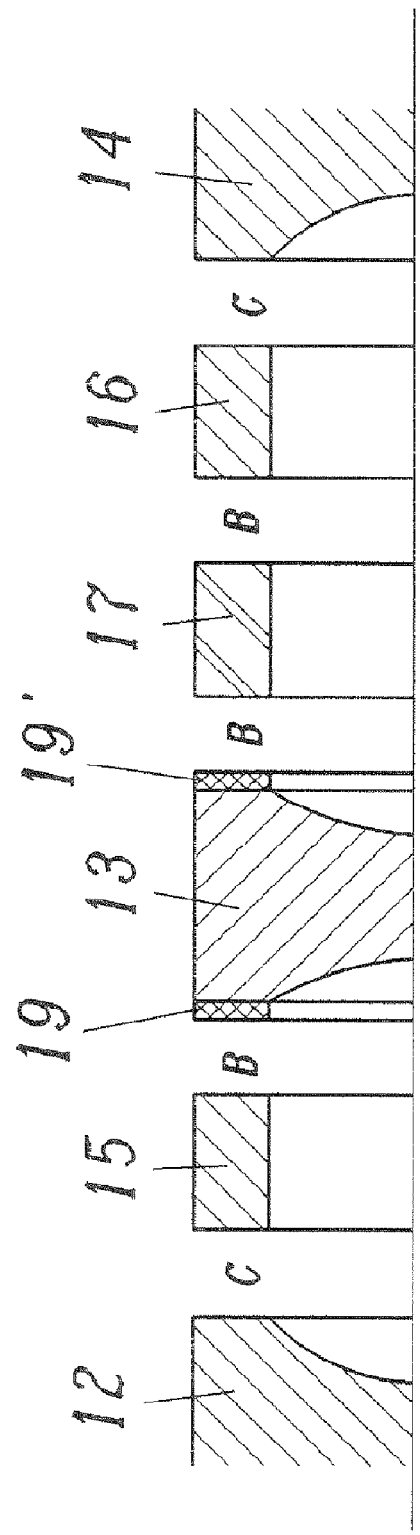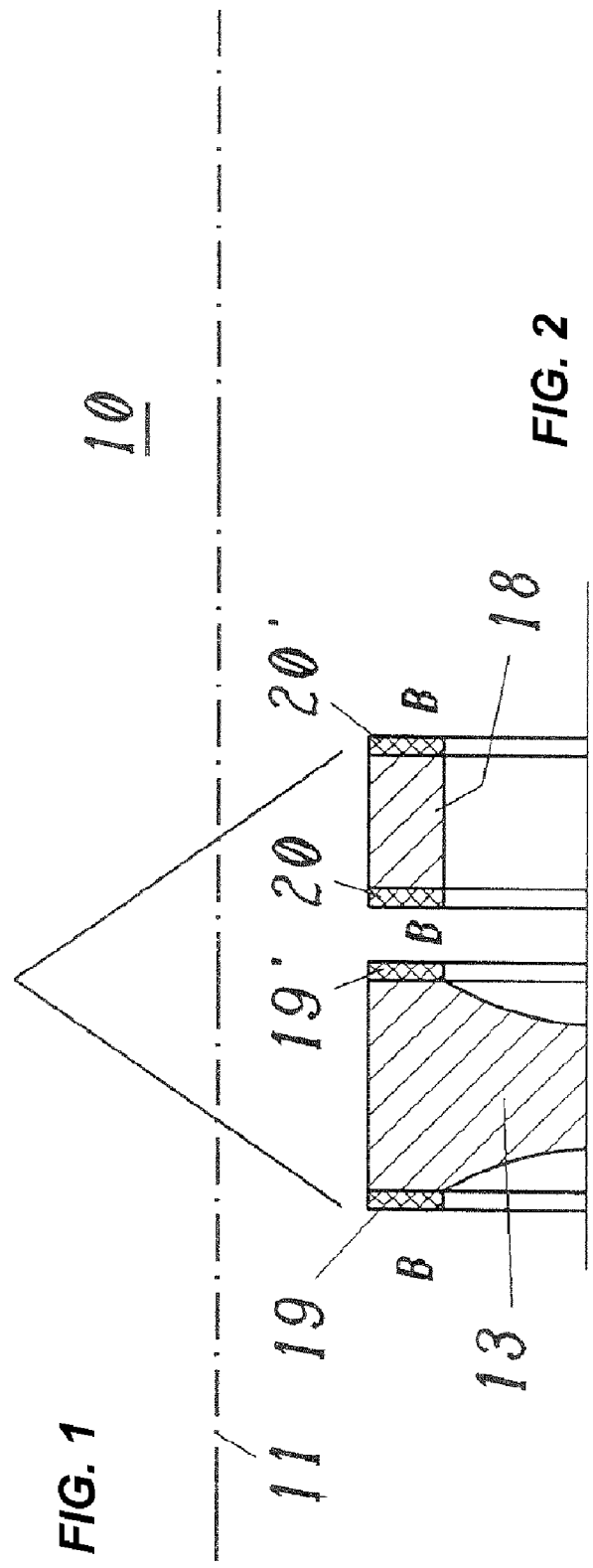
FIG. 1
FIG. 2

WELDED ROTOR FOR A THERMAL MACHINE, AND PROCESS FOR PRODUCING A ROTOR OF THIS TYPE

This application claims priority under 35 U.S.C. § 119 to German application number 103 48 424.8, filed Oct. 14, 2003, the entirety of which is incorporated by reference herein.

BACKGROUND OF THE INVENTION

1. Field of the Invention

The present invention deals with the field of rotating thermal machines. It relates to a welded rotor for a thermal machine, and to a process for producing a rotor of this type.

A rotor of the abovementioned type is known, for example, from DE-A1 101 12 062.

2. Brief Description of the Related Art

Critical components, such as for example forged rotors or tubes or cast housings for high-temperature steam power plants or components of gas turbines or other turbomachines with operating temperatures of >700° C. have to be produced from nickel-base alloys having the required mechanical and creep strength at these temperatures.

First of all, at temperatures immediately above the use range of high temperature steels, nickel-base alloys which have a chemical composition enabling them to achieve the desired high-temperature properties in a simple way by solution-annealing at a temperature of typically close to 1000° C. followed by cooling are selected.

If the operating temperatures are higher still, even more complex nickel-base alloys are required such that they have the required mechanical and creep strength at even higher temperatures (typically >750° C.). These alloys have even more complex compositions, enabling them to achieve the desired properties through the formation of stable precipitations. Precipitations of this nature are produced by a heat treatment combined with precipitation hardening, which follows the preceding solution annealing and is generally carried out in a temperature range between 700 and 900° C.

Precipitation-hardenable nickel-base alloys of this type have the desired properties for applications in the temperature range>>700° C., but also have a number of drawbacks:

on account of the lack of suitable manufacturing devices and on account of their tendency to form cracks during production, they cannot be produced and machined in the sizes required for large rotors, tubes or housings;

on account of the broad solidification range of the alloys, they are difficult to weld without the formation of solidification cracks, which would make them unsuitable for use (cf. for example: High Temperature Materials for Power Engineering, Liege, 24–27 Sep. 1990, p. 1309, p. 1461, p. 1471 and p. 1481);

in particular, welding of the fully hardened material promotes the formation of cracks on account of the relative inability of the material to compensate for the differential expansions which occur during welding;

the alloys are expensive on account of the elements which are added to produce the high-temperature strength as a result of precipitation reactions.

In the case of large components, such as rotors, housings or the like, which are subject to high temperatures in operation, there are often regions in which the operating temperature is highest and regions in which the operating temperature is well below the highest operating temperature. For situations of this type, it has already been proposed some time ago to assemble (weld together) the components from a plurality of subsections consisting of a material which is adapted to the operating temperature of the corresponding section in accordance with the operating temperature distribution.

For example, it is known from DE-A1 199 53 079, in order to form a component, to weld together two parts made of high-alloy, heat-resistant martensitic/ferritic steels, austenitic steels or superalloys based on nickel, nickel-iron and cobalt, with at least one of the parts first of all being plated with a nickel-base filler in the joining region, the plated material then being subjected to a high grade heat treatment, and finally the parts being welded together using the same filler. In an exemplary embodiment which is explained in more detail, a first part made of IN706 (Inconel 706), for example a disk of a rotor (which is assembled from a plurality of disks) in the solution-annealed state, is plated with the filler SG-NiCr20Nb by means of submerged arc welding with wire. Then, the plated IN706 disk is subjected to a heat treatment required for the high-grade quality (stabilization anneal at 820+/−15° C., cooling to RT, precipitation hardening at 730+/−15° C., cooling to RT). The plated IN706 disk is then welded to a further plated disk formed from the high-alloy martensitic/ferritic steel St13TNiEL, the root layers being applied by means of TIG welding and the reinforcing layers being applied by means of submerged arc wire welding. Then, the welded component undergoes a stress-relief anneal at 610+/−15° C.

DE-A1 101 12 062 proposes a process for welding together two parts which are subject to different levels of thermal loading and are intended in particular for a turbomachine. The first part consists of steel and the second part consists of a nickel-base alloy. In this process, prior to the welding, first of all an interlayer, in which the additional elements which are present in the nickel-base alloy and are responsible for crack formation decrease progressively from the inside outward, is applied to the second part made of the nickel-base alloy. The second part preferably consists of IN625 (Inconel 625). The interlayer, which is built up from a plurality of individual layers, preferably consists of IN617 (Inconel 617).

Particularly in the case of rotors of large steam or gas turbines, the quality of the weld seams between the individual rotor disks is crucial for the mechanical properties of the rotor. It is therefore very important for the weld seams to be checked for defects using a nondestructive test method, such as ultrasound or X-ray testing, as accurately as possible and with a high resolution. If the rotor is constructed exclusively from individual rotor disks which are welded together, the encircling weld seams can only be tested without obstacle from the outside, since the spaces between adjacent rotor disks form a cavity which is closed off with respect to the outside. Although it has already been proposed (cf. for example U.S. Pat. No. 6,152,697) to provide inspection openings leading into the cavity in a welded rotor in order for the weld seams to be tested from the cavity side, these inspection openings allow only very restricted access which is not suitable for ultrasound and X-ray testing.

Testing of the weld seams from both sides is required in particular in the case of the ultrasound testing of weld seams which contain nickel-base alloys as fillers, since the ultrasound pulses are relatively strongly attenuated in these weld seams. In the case of X-ray testing, unimpeded access from both sides is required in order for the X-ray source to be arranged on one side and the associated receiving device, such as for example an X-ray film or the like, to be arranged on the other side.

SUMMARY OF THE INVENTION

Therefore, one aspect of the present invention includes providing a rotor which is composed of a plurality of individual elements welded together and which allows unimpeded testing of the critical weld seams by nondestructive testing methods in a simple manner, as well as a process for producing it.

Another aspect of the present invention includes inserting a rotor ring between two adjacent rotor disks made of a nickel-base alloy and a steel, said rotor ring being welded to both rotor disks. The inserted rotor ring may first of all be welded on one side to the rotor disk consisting of a nickel-base alloy, producing a critical encircling weld seam which has to be accurately tested. As long as the interior space surrounded by the rotor ring has not yet been closed up by welding on the other rotor disk, it is possible to test the critical encircling weld seam from the inside and the outside without obstacle, on account of the fact that the interior space is still open on one side. This can be particularly advantageous if the encircling weld seam, according to an exemplary configuration of the invention, contains a nickel-base alloy as filler.

Another configuration in accordance with principles of the present invention which is suitable for particularly high operating temperatures is characterized in that the first rotor disk consists of a precipitation-hardened nickel-base alloy, and in that a second rotor ring formed from a solution-annealed nickel-base alloy is inserted between the first rotor ring and the first rotor disk and is in each case welded to the first rotor disk and the first rotor ring by means of an encircling weld seam. In this case too, the encircling weld seams between the second rotor ring and the first rotor disk and between the second rotor ring and the first rotor ring preferably contain a nickel-base alloy as filler.

One exemplary configuration of the process according to the present invention is characterized in that before the first rotor ring is welded to the first rotor disk, first of all a second rotor ring is welded to the first rotor disk, in that the encircling weld seam which joins the second rotor ring to the first rotor disk is then internally and/or externally tested by means of a nondestructive testing method, in particular using ultrasound and/or X-radiation, and in that the first rotor ring is then joined to the first rotor disk by welding the two rotor rings.

BRIEF DESCRIPTION OF THE DRAWINGS

The invention is to be explained in more detail below on the basis of exemplary embodiments in conjunction with the drawing, in which:

FIG. 1 shows a longitudinal section though the as yet unwelded parts of a rotor in accordance with a preferred exemplary embodiment of the invention, with the fillers used at the joining locations being denoted by capital letters (B, C);

FIG. 2 shows a variant for the central part of the rotor from FIG. 1;

DETAILED DESCRIPTION OF EXEMPLARY EMBODIMENTS

Figure 3:
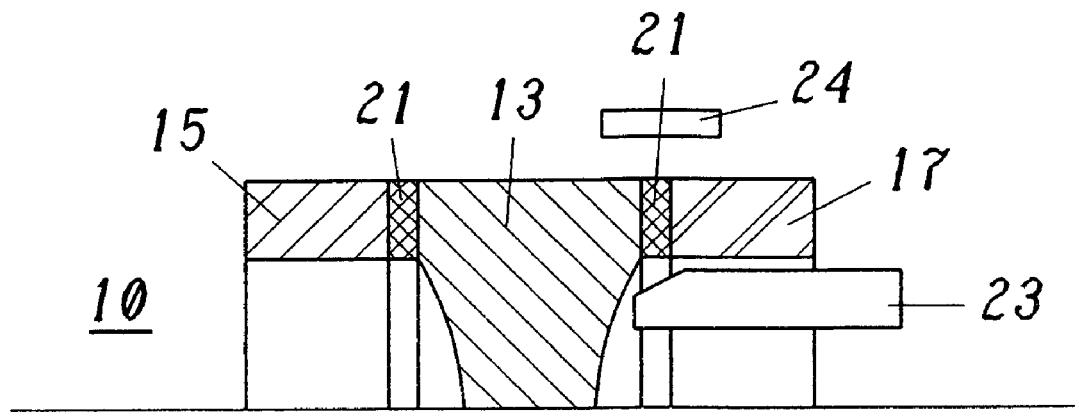
FIG. 3 shows the X-ray testing of the weld seam in the intermediate stage shown in FIG. 9.

FIG. 1 shows an excerpt from a longitudinal section though various individual elements 12, . . . , 17 which are arranged in a row along a rotor axis 11 and from which the rotor 10 is welded together in accordance with a preferred exemplary embodiment. The various elements comprise thee (circular) rotor disks 12, 13 and 14 and thee (circular) rotor rings 15, 16 and 17 which are arranged between the rotor disks 12, 13, 14. In the example illustrated, the central rotor disk 13 is made of a material A which is a precipitation-hardenable nickel-base alloy that is typically subjected to a three-stage heat treatment at, for example, 1050° C., 850° C. and 760° C. Material A may, for example, be Waspalloy®. The other two rotor disks 12 and 14, like the rotor rings 15 and 16, are made of a material C which is in particular a 10% Cr steel which is subjected to a two-stage heat treatment at, for example, 1050° C. and 700° C. The third rotor ring 17 is of a material B which is a solution-annealed nickel-base alloy that is subjected to a single heat treatment at, for example, 1050° C. Material B may, for example, be IN617 (Inconel ®617). Materials B and C are also—as indicated in FIGS. 1 and 2—used as fillers in the welded joints between the rotor rings and rotor disks.

Figure 4:
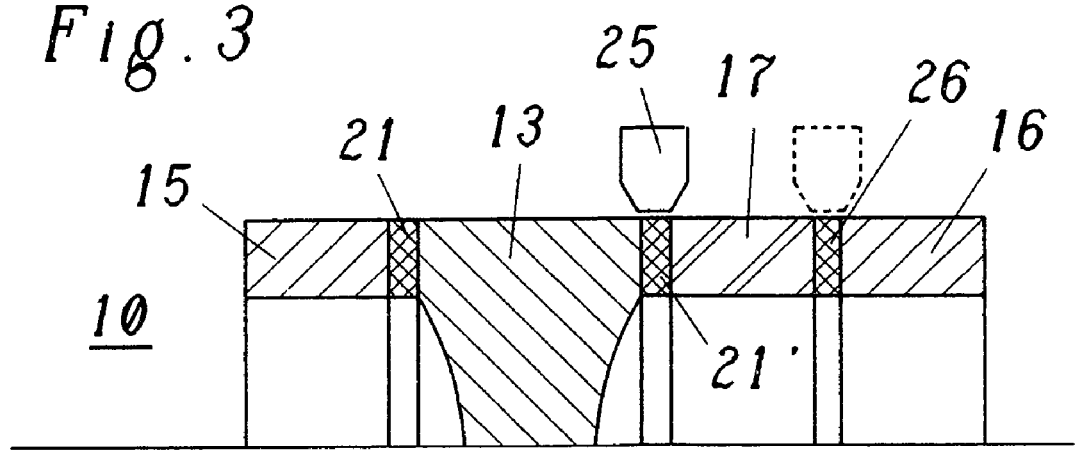
FIG. 4 shows the ultrasound testing from the outside in a subsequent intermediate stage.
Figure 6:
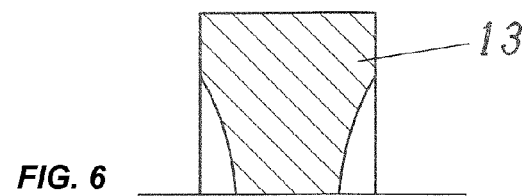
FIGS. 6–9 show various steps up until an intermediate stage of production of the rotor in accordance with FIG. 1

FIGS. 3, 4, and 6 illustrate the production steps involved in assembling the rotor 10 shown in FIG. 1, in which only the central rotor disk 13 consists of material A. However, it is also conceivable, in accordance with FIG. 2, to provide a combination of a central rotor disk 13 and an adjoining rotor ring 18 which both consist of material A and are provided with interlayers 19, 19' and 20, 20', respectively, prior to welding, instead of the central rotor disk 13.

Figure 7:
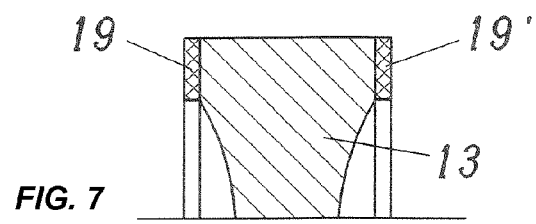
Figure 8:
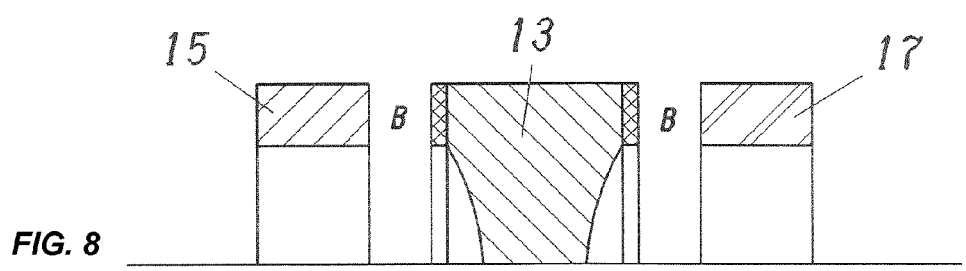
Figure 9:
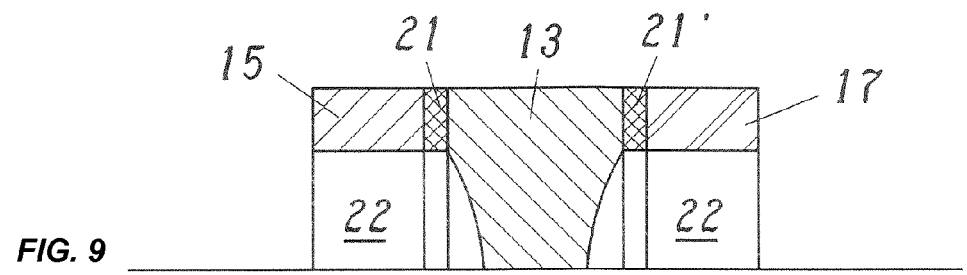

During production of the rotor 10, in accordance with FIG. 6 the starting point is the central rotor disk 13 made of the material A which has been solution-annealed at 1050° C. Then, intermediate layers 19, 19' formed from the material B or a similar material are applied at what will subsequently form the joining locations, by build-up welding (FIG. 7). After the build-up welding of the interlayers 19, 19', the rotor disk 13 is held at typically 850° C. in order to relieve the stresses produced during welding and to approximately reach the full strength of the material A by precipitation hardening. Then, the rotor disk 13, in accordance with FIGS. 8 and 9, is welded to the adjacent rotor rings 15 and 17, which consist of material C and B, respectively. A material of type B or similar, such as for example IN617, is used as filler for the welding operation and reaches its full strength during cooling from the molten state during welding.

The weld seams 21, 21' which form (FIG. 9), since the rotor rings 15, 17 surround a cavity 22 which is still accessible from the outside, are now accessible both from the outside and from the inside. This fact can be made use of in order to subject the weld seams to an accurate and careful quality inspection by means of a nondestructive testing method. This is shown in FIG. 3 for the weld seam 21' using the example of an X-ray test: an X-ray source (X-ray tube) 23 is pushed into the cavity in the rotor ring 17, so that the X-radiation which is emitted can penetrate radially though the weld seam 21' from the inside outward. The image of the weld seam 21' is recorded by means of an externally arranged X-ray recording apparatus 24, e.g., an X-ray film, and can then be evaluated. In the arrangement shown in FIG. 3, it is also possible for the X-ray source 23 and X-ray recording apparatus 24 to swap places. Of course, it is also conceivable to use suitable electronic recording and evaluation apparatus.

Figure 5:
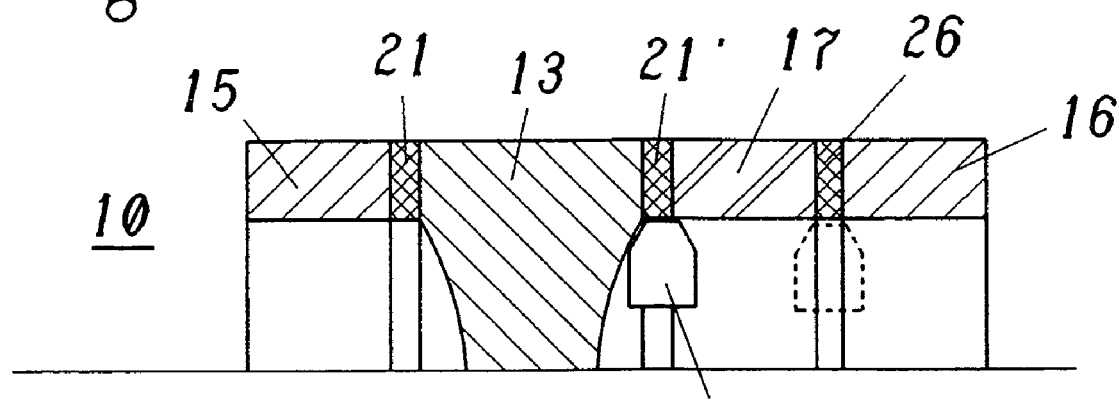
FIG. 5 shows the ultrasound testing from the inside in a subsequent intermediate stage.

However, unimpeded access to the inner side of the rotor rings or weld seams is also advantageous when using ultrasound testing methods: if the weld seams contain fillers of material type B (nickel-based), given the required wall thicknesses for the rotor, complete testing is only possible, on account of the relatively high absorption of sound in the weld seam, if the testing is carried out from the inside and the outside. The ultrasound testing of the weld seam 21' from the outside and the inside by means of an ultrasound measuring head 25 is illustrated in FIGS. 4 and 5. The next weld seam 26, between the two rotor rings 16 and 17, which likewise contains filler of type B, may likewise be tested by means of ultrasound from the inside and the outside (ultrasound measuring head illustrated by dashed lines). Only when these tests have been successfully concluded can the cavities 22 surrounded by the rotor rings 15, . . . , 17 be closed up by welding on the next rotor disks 12 and 14 made of material C. The weld seams produced contain only filler of type C and can therefore be tested only from the outside by means of ultrasound without this presenting any difficulties.

The characteristics and advantages of the invention can be summarized as follows:

especially when welding rotors, it is advantageous for (internally hollow) rotor rings rather than rotor disks to be welded to the rotor disk, which is exposed to the highest temperature, made of material A and an adjoining ring of material B, so that the weld seams are accessible from the root and from above (from the inside and the outside) for testing;

in this way, it is possible to carry out nondestructive testing of all the welded joints between material A and material B with a high degree of accuracy, specifically using ultrasound and X-ray methods, resulting in improved fault resolution;

this is advantageous in particular in the case of welded joints between materials A and A, A and B and B and C, if a nickel-base alloy is used as weld material, since the greater ultrasound damping means that it is more difficult to test this material from just one side than a steel weld metal;

welded joints between rotor disks and rotor rings formed from material C with a steel weld metal (material C) can be realized at the (downstream) locations which are subject to reduced thermal loading (welded joints between elements 12 and 15 and 14 and 16 in FIG. 1), which welded joints are typically heat-treated at 680° C. following welding and can easily be tested only from the outside using ultrasound.

List of Designations

| | |
|---|---|
| 10 | Rotor |
| 11 | Rotor axis |
| 12, 13, 14 | Rotor disk |
| 15, . . . , 18 | Rotor ring |
| 19, 19' | Intermediate layer (cladding layer) |
| 20, 20' | Intermediate layer (cladding layer) |
| 21, 21', 26 | Weld seam |
| 22 | Cavity |
| 23 | X-ray source |
| 24 | X-ray recording apparatus (e.g. X-ray film) |
| 25 | Ultrasound measuring head |

While the invention has been described in detail with reference to exemplary embodiments thereof, it will be apparent to one skilled in the art that various changes can be made, and equivalents employed, without departing from the scope of the invention. Each of the aforementioned documents is incorporated by reference herein in its entirety.

What is claimed is:

1. A rotor for a thermal machine, the rotor comprising:
a plurality of rotor disks arranged one behind the other along a rotor axis and being welded to one another, at least one first rotor disk, which at least one first rotor disk is arranged in a section of the rotor which is subject to particularly high thermal loads, comprising a nickel-base alloy able to withstand high temperatures and the at least one first rotor disk being welded to at least one second adjacent rotor disk, the at least one second rotor disk comprising a steel able to withstand high temperatures;
a first rotor ring consisting of a steel able to withstand high temperatures inserted between the at least one first rotor disk and the at least one second rotor disk;
an encircling weld seam; and
wherein the first rotor ring has one side welded to the at least one second rotor disk and another side joined to the at least one first rotor disk via the encircling weld seam.

2. The rotor as claimed in claim 1, wherein the encircling weld seam contains a filler comprising a nickel-base alloy.

3. A process useful for producing a rotor as claimed in claim 1, the method comprising:
first joining the first rotor ring to the at least one first rotor disk;
second nondestructively testing the encircling weld seam which joins the first rotor ring to the at least one first rotor disk internally, externally, or both; and
third joining a free side of the first rotor ring to the at least one second rotor disk by welding.

4. A rotor for a thermal machine, the rotor comprising:
a plurality of rotor disks arranged one behind the other along a rotor axis and being welded to one another, at least one first rotor disk, which at least one first rotor disk is arranged in a section of the rotor which is subject to particularly high thermal loads, comprising a nickel-base alloy able to withstand high temperatures and the at least one first rotor disk being welded to at least one second adjacent rotor disk, the at least one second rotor disk comprising a steel able to withstand high temperatures:
a first rotor ring made of a steel able to withstand high temperatures inserted between the at least one first rotor disk and the at least one second rotor disk; and
an encircling weld seam;
wherein the first rotor ring has one side welded to the at least one second rotor disk and another side joined to the at least one first rotor disk via the encircling weld seams;
wherein the at least one first rotor disk comprises a precipitation-hardened nickel-base alloy;
a second encircling weld seam; and
a second rotor ring formed from a solution-annealed nickel-base alloy inserted between the first rotor ring and the at least one first rotor disk and welded to the at least one first rotor disk and to the first rotor ring by the second encircling weld seam.

5. The rotor as claimed in claim 4, wherein the encircling weld seams between the second rotor ring and the first rotor disk and between the second rotor ring and the first rotor ring include a filler comprising a nickel-base alloy.

6. The rotor as claimed in claim 4 wherein the thermal machine comprises a steam or gas turbine.

7. A process useful for producing a rotor as claimed in claim 1, the method comprising:

first joining the first rotor ring to the at least one first rotor disk;

second nondestructively testing the encircling weld seam which joins the first rotor ring to the at least one first rotor disk internally, externally, or both;

third joining a free side of the first rotor ring to the at least one second rotor disk by welding;

before welding the first rotor ring to the at least one first rotor disk, welding a second rotor ring to the at least one first rotor disk;

nondestructively testing the encircling weld seam which joins the second rotor ring to the at least one first rotor disk internally, externally, or both; and joining the first rotor ring to the at least one first rotor disk by welding the two rotor rings.

8. The process as claimed in claim 7 further comprising:
to weld the at least one first rotor disk to the first rotor ring or to the second rotor ring, applying first an interlayer which enhances welding properties, in the region of the subsequent weld seam.

9. The process as claimed in claim 8, wherein applying the interlayer which enhances welding properties comprises build-up welding.

10. The process as claimed in claim 7, wherein nondestructive testing comprises ultrasound testing, X-radiation testing, or both.

11. The process as claimed in claim 7, wherein nondestructive testing comprises ultrasound testing, X-radiation testing, or both.

12. The process as claimed in claim 7, further comprising:
to weld the at least one first rotor disk to the first rotor ring or to the second rotor ring, applying first an interlayer which enhances welding properties, in the region of the subsequent weld seam.

13. The process as claimed in claim 12, wherein applying the interlayer which enhances welding properties comprises build-up welding.

14. A rotor for a thermal machine, the rotor comprising:
a plurality of rotor disks arranged one behind the other along a rotor axis and being welded to one another, at least one first rotor disk, which at least one first rotor disk is arranged in a section of the rotor which is subject to particularly high thermal loads, comprising a nickel-base alloy able to withstand high temperatures and the at least one first rotor disk being welded to at least one second adjacent rotor disk, the at least one second rotor disk comprising a steel able to withstand high temperatures;

a first rotor ring made of a steel able to withstand high temperatures inserted between the at least one first rotor disk and the at least one second rotor disk;

an encircling weld seam;

wherein the first rotor ring has one side welded to the at least one second rotor disk and another side joined to the at least one first rotor disk via the encircling weld seam;

wherein the encircling weld seam contains a filler comprising a nickel-base allows;

wherein the at least one first rotor disk comprises a precipitation-hardened nickel-base alloy;

a second encircling weld seam; and a second rotor ring formed from a solution-annealed nickel-base alloy inserted between the first rotor ring and the at least one first rotor disk and welded to the at least one first rotor disk and to the first rotor ring by the second encircling weld seam.

15. The rotor as claimed in claim 14, wherein the encircling weld seams between the second rotor ring and the first rotor disk and between the second rotor ring and the first rotor ring including a filler comprising a nickel-base alloy.

* * * * *